US012562456B2

(12) United States Patent
Duan et al.

(10) Patent No.: US 12,562,456 B2
(45) Date of Patent: Feb. 24, 2026

(54) ELECTRONIC DEVICE

(71) Applicant: BEIJING XIAOMI MOBILE SOFTWARE CO., LTD., Beijing (CN)

(72) Inventors: Xiaochao Duan, Beijing (CN); Wanbo Xie, Beijing (CN); Xiaolei Jiang, Beijing (CN); Weihui Zhu, Beijing (CN); Xiaodong Shang, Beijing (CN); Yong Liu, Beijing (CN); Xuwang Cui, Beijing (CN); Zonglin Xue, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 171 days.

(21) Appl. No.: 17/681,752

(22) Filed: Feb. 26, 2022

(65) Prior Publication Data

US 2023/0042513 A1 Feb. 9, 2023

(30) Foreign Application Priority Data

Aug. 5, 2021 (CN) ......................... 202110898513.9

(51) Int. Cl.
*H01Q 1/24* (2006.01)
*H01Q 5/25* (2015.01)
*H01Q 5/307* (2015.01)

(52) U.S. Cl.
CPC ............... *H01Q 1/243* (2013.01); *H01Q 5/25* (2015.01); *H01Q 5/307* (2015.01)

(58) Field of Classification Search
CPC .......... H01Q 1/243; H01Q 5/25; H01Q 5/307; H04M 1/0262
See application file for complete search history.

(56) References Cited

U.S. PATENT DOCUMENTS 10,847,871 B2 * 11/2020 Han ........................ H01Q 1/243
2014/0232602 A1 * 8/2014 Hsu ........................ H01Q 1/243 343/702
2015/0138021 A1 * 5/2015 Konu ..................... H01Q 1/243 343/702
2015/0155614 A1 6/2015 Youn et al.
2015/0288053 A1 10/2015 Saxe et al.
2017/0006143 A1 * 1/2017 Yang ...................... H01Q 1/243
2017/0141470 A1 * 5/2017 Yong ...................... H01Q 1/243
2018/0241861 A1 * 8/2018 Kim .................... H04M 1/0262
2018/0277929 A1 9/2018 Seo et al.

(Continued)

FOREIGN PATENT DOCUMENTS

AU 2016216322 B9 * 8/2016 .............. H04M 1/02
CN 110149434 A * 8/2019 ............ F16B 11/006

(Continued)

OTHER PUBLICATIONS

European Patent Application 22159236.3, Search and Opinion dated Aug. 4, 2022, 12 pages.

*Primary Examiner* — Dameon E Levi
*Assistant Examiner* — Aladdin Abdulbaki
(74) *Attorney, Agent, or Firm* — Cozen O'Connor

(57) ABSTRACT

An electronic device includes: a housing having an accommodation cavity, a circuit board being arranged in the accommodation cavity; a screen holder coupled to the housing and comprising at least one antenna radiator electrically coupled to the circuit board to receive and/or transmit signals; and a screen with an edge arranged on the screen holder.

16 Claims, 3 Drawing Sheets

(56) References Cited

U.S. PATENT DOCUMENTS

| | | | | |
|---|---|---|---|---|
| 2019/0109622 | A1* | 4/2019 | Wang | H01Q 1/243 |
| 2020/0365972 | A1* | 11/2020 | Jeon | H01Q 1/12 |
| 2021/0167487 | A1* | 6/2021 | Varma | H01Q 1/243 |
| 2022/0345552 | A1* | 10/2022 | Wu | H01Q 1/243 |
| 2023/0209701 | A1* | 6/2023 | Bae | H05K 1/0243 |

FOREIGN PATENT DOCUMENTS

| | | | | |
|---|---|---|---|---|
| EP | 3826107 | A1 * | 5/2021 | H01Q 1/36 |
| WO | WO 2020214758 | A1 * | 10/2020 | H01Q 1/243 |
| WO | WO 2021008608 | A1 | 1/2021 | |

* cited by examiner

ELECTRONIC DEVICE

CROSS-REFERENCE TO RELATED APPLICATIONS

The present application claims benefit of and priority to Chinese Patent Application Serial No. 202110898513.9, filed on Aug. 5, 2021, the entire contents of which are incorporated herein by reference.

FIELD

The present disclosure relates to the field of antenna designs and, more particularly, to an electronic device.

BACKGROUND

Antennas affect signal reception of electronic devices, which, in turn, has a significant impact on user experience of cell phones and other electronic devices. In existing electronic devices, a middle frame usually serves as a main body of an antenna design. For example, many cell phones adopt the middle frame for the antenna design. With the constant improvement of electronic devices, some electronic devices have eliminated the need for the middle frame. For example, some cell phones with a ceramic structure do not have any middle frame because they employ an integrated ceramic housing. For this type of electronic devices, the existing antenna designs cannot meet the requirement for multi-band antenna design.

SUMMARY

Embodiments of the present disclosure provide an electronic device. The electronic device includes: a housing having an accommodation cavity, a circuit board being arranged in the accommodation cavity; a screen holder coupled to the housing and including at least one antenna radiator electrically coupled to the circuit board to receive and/or transmit signals; and a screen with an edge arranged on the screen holder.

DETAILED DESCRIPTION OF EMBODIMENTS

Embodiments will be described in detail, with examples thereof illustrated in the accompanying drawings. The embodiments described with reference to the accompanying drawings are exemplary and are intended to explain the present disclosure rather than limit the present disclosure.

Figure 1:
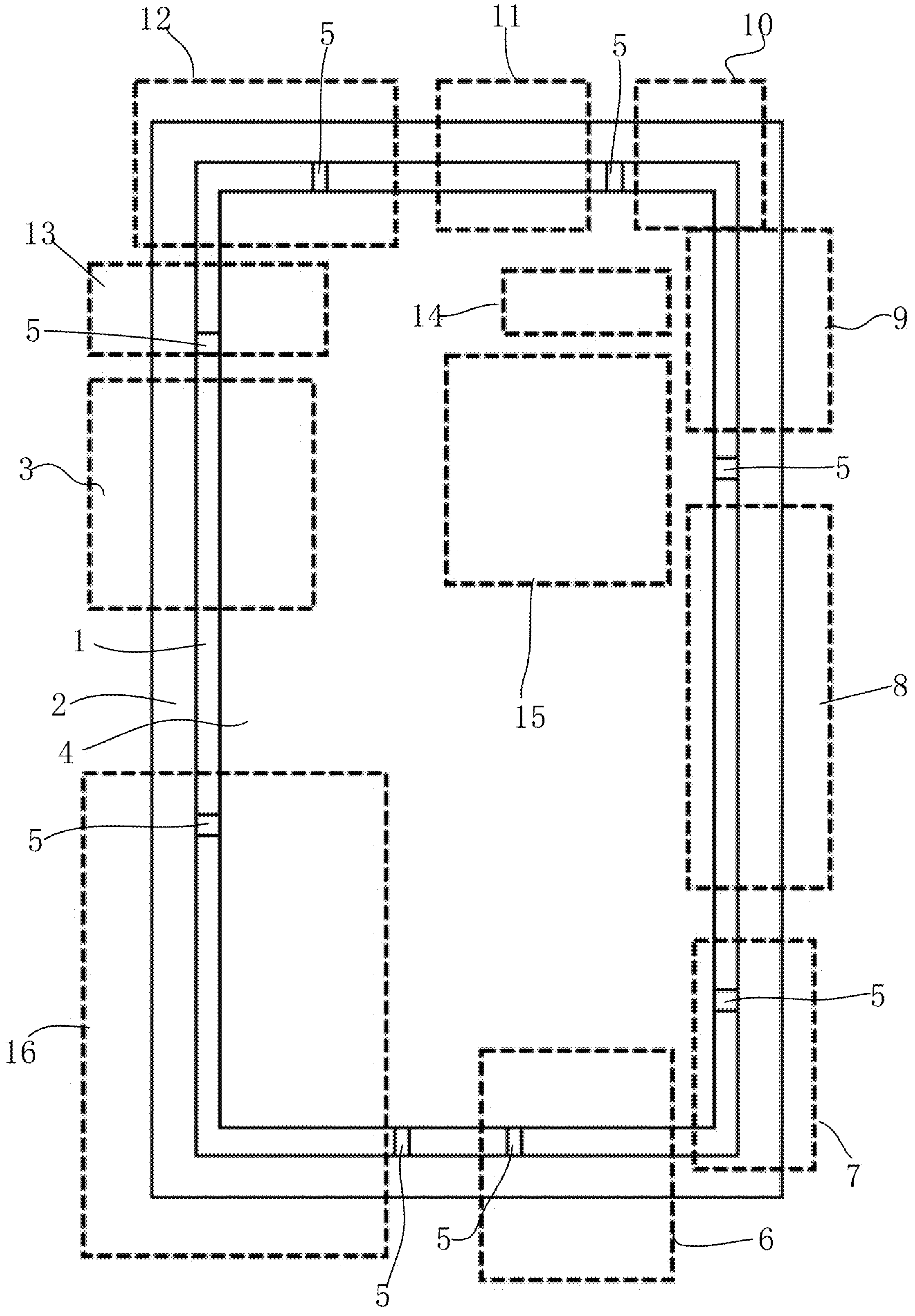
FIG. 1 illustrates an orientation arrangement diagram of an antenna arrangement in an embodiment of the present disclosure.
Figure 2:
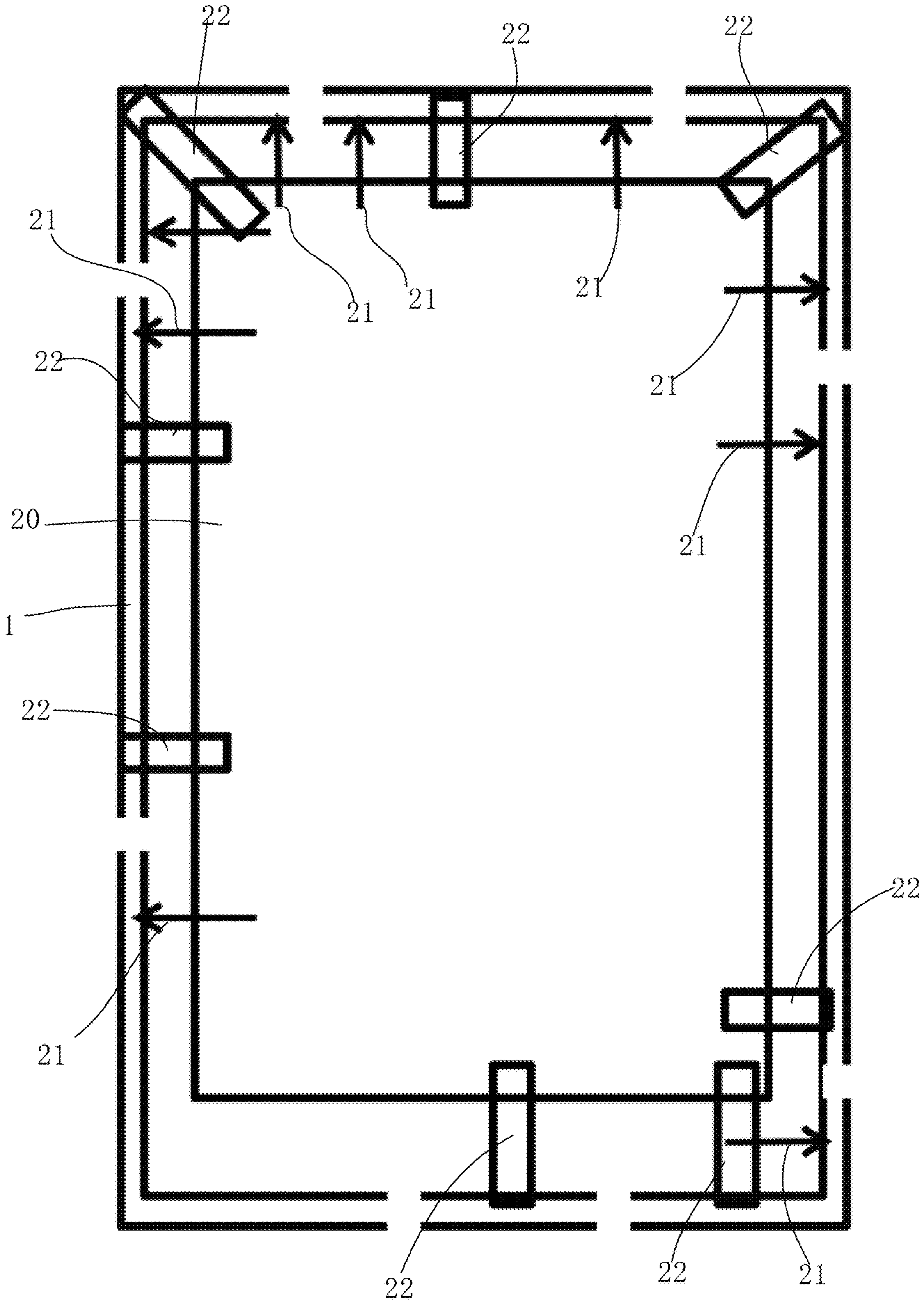
FIG. 2 illustrates an antenna feed point and grounding principles in an embodiment of the present disclosure.
Figure 3:
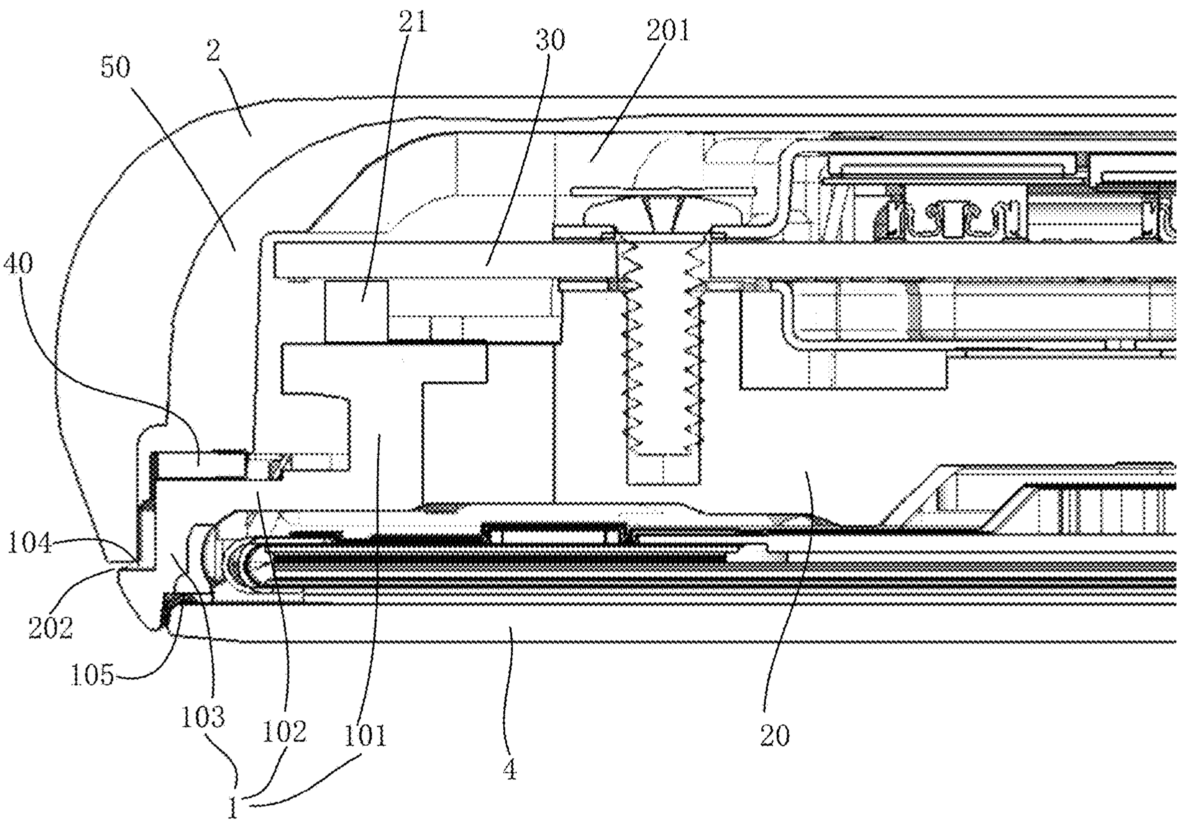
FIG. 3 illustrates a sectional view of an electronic device in an embodiment of the present disclosure.

The embodiments provide an electronic device, which may be a cell phone, a tablet computer, or other communication electronic devices. Referring to FIGS. 1-3, the electronic device includes a housing 2, a screen holder 1, and a screen 4. The housing 2 has an accommodation cavity 201, and a circuit board 30 is arranged in the accommodation cavity 201. Various electronic elements and other necessary components of the electronic device may be arranged within the accommodation cavity 201, and the circuit board 30 is one of the electronic elements. Other electronic elements and necessary components are less relevant to the improvement of this solution and will not be described one by one.

The screen holder 1 is coupled to the housing 2, and for example, the screen holder 1 is overall shaped as a frame, and the screen holder 1 is arranged in a position close to a front side of the housing 2.

The screen holder 1 has at least one antenna radiator electrically coupled to the circuit board 30 to receive and/or transmit signals, and an edge of the screen 4 is arranged on the screen holder 1. That is, the screen holder 1 also has an antenna function, and the number and frequency band of the antenna radiators may be set as required.

Thus, since the screen holder 1 also has the antenna function apart from supporting the screen 4, it is unnecessary to arrange any antenna radiator on a metal middle frame of the electronic device, which simplifies the structure of the electronic device and increases the screen-to-body ratio.

In an embodiment, the housing 2 may be prepared using ceramic materials and hence can have a dielectric loading effect on the antenna radiator, improving the stability of receiving and transmitting signals.

The housing 2 may be an integrally molded structure, improving its aesthetics and simplifying the assembly process. For example, the housing 2 is an integrally molded ceramic housing, and the electronic device feels better and becomes more aesthetic.

In an embodiment, referring to FIG. 3, there is a gap 202 between an edge of the housing 2 and the edge of the screen 4, a part of the structure of the screen holder 1 is located in the accommodation cavity 201, and this part of the structure passes through the gap 202, allowing the antenna radiator of the screen holder 1 to better receive and transmit signals. As a result, the screen holder 1 protrudes from the accommodation cavity 201 through the gap 202 between the edges of the housing 2 and the screen 4, which basically will not increase the size of the electronic device and can meet arrangement requirements of multi-antenna schemes.

In addition, since the housing 2 adopts the ceramic material and has the dielectric loading effect on the antenna radiator, a part of the screen holder 1 passing through the gap 202 can be made very narrow, and only a small part of the screen holder 1 needs to be exposed to achieve a good antenna effect. Thus, the gap 202 between the edges of the housing 2 and the screen 4 can also be made very narrow, improving the overall aesthetics of the electronic device. In some embodiments, the gap 202 between the edges of the housing 2 and the screen 4 may have a size of 0.5 mm, 0.6 mm, 0.7 mm, 0.8 mm, 0.9 mm, 1.0 mm, 1.1 mm, or 1.2 mm, and so on. The corresponding part of the screen holder 1 passing through the gap 202 may have a width slightly smaller than the size of the gap 202.

In another aspect, the housing 2 may also be prepared using other materials that have the dielectric loading effect.

In order to ensure the sealing performance, the edges of the screen 4 and the housing 2 may squeeze the screen holder 1 to a certain extent, reducing the gap and improving the sealing performance and the aesthetics.

In an embodiment, a main part 20 is arranged within the accommodation cavity; the circuit board 30 is fixed to a first side of the main part 20, and the screen 4 is located on a second side of the main part 20; the screen holder 1 surrounds the main part 20. The main part 20 may be a mounting base for other components within the electronic device. The main part 20 may be made of metal and may also act as the ground.

In an embodiment, a cross section of the screen holder 1 includes an inwardly extending portion 101, an intermediate connecting portion 102, and an outwardly extending portion 103. The inwardly extending portion 101 is electrically coupled to the circuit board 30. Two ends of the intermediate connecting portion 102 are coupled to the inwardly extending portion 101 and the outwardly extending portion 103, respectively. The outwardly extending portion 103 passes through the gap 202 between the edges of the housing 2 and the screen 4 and supports the edge of the screen 4.

Thus, the screen holder 1 at least partially occupies space in a thickness direction of the electronic device, which can reduce occupation in the space of the screen 4 and make the screen-to-body ratio close to 100%.

As shown in FIG. 3, the inwardly extending portion 101 may be T-shaped, the intermediate connecting portion 102 is shaped as a flat plate, and the outwardly extending portion 103 is fitted with the housing 2.

In an embodiment, the outwardly extending portion 103 has a first step surface 104 and a second step surface 105, and the edge of the housing 2 supports the first step surface 104 while the second step surface 105 supports the edge of the screen 4. The first step surface 104 and the second step surface 105 may be parallel to each other.

In an embodiment, the inwardly extending portion 101 and the outwardly extending portion 103 both extend along the thickness direction of the electronic device. The thickness direction herein refers to an up-down direction in FIG. 3. The intermediate connecting portion 102 may be parallel to the screen 4.

Referring to FIGS. 1 and 2, the screen holder 1 includes a plurality of antenna radiators, each of which is electrically coupled to the circuit board 30. Two or more of the antenna radiators have different signal frequency bands.

For example, the plurality of antenna radiators are spaced apart by insulators 5. The insulators 5 may couple adjacent antenna radiators, and reduce signal interference between the adjacent antenna radiators because adjacent antenna radiators need to be insulated from each other to adapt to reception and transmission of signals in different frequency bands.

In an embodiment, the housing 2 is integrally made of a ceramic material, and the insulator 5 has a width less than or equal to 2 mm, which, for example, may be 1.5 mm, 1.2 mm, or 1.0 mm, etc. Reducing the width of the insulator 5 can allow the screen holder 1 to support the screen 4 better. The insulators 5 may be made of plastic.

If the screen holder 1 includes one antenna radiator, the screen holder 1 may purely use metal materials. If the screen holder 1 includes a plurality of antenna radiators, the screen holder 1 may use plastic and metal materials at the same time, in which a metal part of the screen holder constitutes a corresponding antenna radiator and a plastic part plays a role of insulation.

If the screen holder 1 includes a plurality of antenna radiators, the screen holder 1 may adopt a metal material overall, and then be slotted at a junction of two antenna radiators, with a plastic material being filled in the slot; alternatively, the screen holder 1 may adopt a plastic material overall, and metal layers may be arranged in positions where the screen holder needs to act as antenna radiators.

In an embodiment, a signal band of at least one antenna radiator is a 2G frequency band; a signal band of at least one antenna radiator is a 3G frequency band; a signal band of at least one antenna radiator is a 4G frequency band; and a signal band of at least one antenna radiator is a 5G frequency band. Certainly, those skilled in the field may provide only a part of the antenna radiators as required for different electronic equipment products.

For example, as shown in FIG. 1, a plurality of antenna radiators are arranged around the screen 4, and the antenna radiators with different frequency bands are arranged in different positions of the screen 4. A plurality of antenna radiators with a certain frequency band may be arranged in different locations. For example, there may be three to four antenna radiators for 5G signals. In addition, the antenna radiators for 5G signals may be arranged on an inner of the housing 2 using an LDS (Laser-Direct-structuring) process. Thus, the electronic device can achieve stronger 5G signals.

As shown in FIG. 1, various antenna radiators of the electronic device include a GPS-WiFi portion 12, a first medium-and-high frequency section 11, a first 5G antenna portion 10, a second medium-and-high frequency section 9, a first low frequency section 8, a second 5G antenna portion 7, a third medium-and-high frequency section 6, a second low frequency section 16, a fourth medium-and-high frequency section 3, a third 5G antenna portion 13, a fourth 5G antenna portion 14, and a UWB antenna portion 15, in which the fourth 5G antenna portion 14 may be arranged on the inner side of the housing 2 using the LDS process.

The antenna radiators in the above embodiments may all be provided using the LDS process.

In an embodiment, a UWB antenna, i.e., the UWB antenna portion 15 in FIG. 1, is arranged on an inner wall of the housing 2, and the UWB antenna is electrically coupled to the circuit board 30.

Referring to FIG. 3, in an embodiment, the main part 20 is arranged in the accommodation cavity 201 and electrically coupled to the circuit board 30. Referring to FIG. 2, each antenna radiator is electrically coupled to the main part 20, which forms grounding protection and ensures the functional stability of each antenna radiator.

In an embodiment, referring to FIG. 2 and FIG. 3, each antenna radiator is electrically coupled to the circuit board 30 by a feeder elastic sheet 21. The feeder elastic sheet 21 has a certain degree of elasticity and can always be elastically pressed on an antenna feed point of the circuit board 30 to ensure good contact. Moreover, the installation of the screen holder 1 becomes more convenient by omitting connection of an antenna signal line.

The number and position of the feeder elastic sheets 21 depends on the arrangement position of the antenna radiators.

In an embodiment, a plastic layer 50 is attached to an inner surface of the housing 2. The plastic layer 50 serves to stabilize various components in a mounting space and also ensures insulation among various electrical elements. The plastic layer 50 extends from an inner wall of a rear housing to an inner wall of a bezel.

For example, an edge of the plastic layer 50 is formed with a support platform, and the support platform supports the screen holder 1, making the installation of the screen holder 1 more stable.

In an embodiment, a waterproof adhesive layer 40 is arranged between the support platform and the screen holder 1 to improve the sealing performance, and the waterproof adhesive layer 40 is located between the plastic layer 50 and the screen holder 1. In an embodiment, the waterproof adhesive layer 40 is located between the plastic layer 50 and the intermediate connecting portion 102.

In the description of the present disclosure, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These terms are for convenience of description and do not indicate or imply that that the device or element referred to must have a particular orientation or be constructed and operated in a particular orientation. Thus, these terms shall not be construed as limitation on the present disclosure.

In addition, terms such as "first" and "second" are used herein for purposes of description and are not intended to indicate or imply relative importance or the number of indicated technical features. Thus, the feature defined with "first" and "second" may include one or more this feature. In the description of the present disclosure, "a plurality of" means at least two (e.g., two or three), unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also communicate with each other; may also be direct connections or indirect connections via intervening structures; may also be inner connection or mutual interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top" of the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "one embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Moreover, different embodiments or examples as well as features in different embodiments or examples may be combined or integrated by those skilled in the art, on the premise of no conflict.

Although embodiments of the present disclosure have been shown and described, it would be appreciated that the above embodiments are exemplary and cannot be construed to limit the present disclosure, and changes, modifications, alternatives and variations can be made in the embodiments without departing from the scope of the present disclosure.

What is claimed is:

1. An electronic device, comprising:

an integrally molded ceramic housing having an accommodation cavity, a circuit board being positioned in the accommodation cavity;

a screen; and a screen holder coupled to the housing and shaped as a hollow frame having an open structure to hold the screen, an edge of the screen being positioned on the screen holder, wherein the screen holder comprises at least one antenna radiator electrically coupled to the circuit board to receive and/or transmit signals; and wherein a cross section of the screen holder comprises an inwardly extending portion, an intermediate connecting portion, and an outwardly extending portion, the inwardly extending portion being an innermost portion of the screen holder; and the inwardly extending portion and the outwardly extending portion both extend along a thickness direction of the electronic device;

wherein a gap exists between an edge of the housing and the edge of the screen and has a size of no more than 1.2 mm;

the inwardly extending portion and the intermediate connecting portion are in the accommodation cavity, and an end of the outwardly extending portion away from the intermediate connecting portion passes through the gap, the inwardly extending portion and the outwardly extending portion extend from the intermediate connecting portion in opposite directions, respectively, so that the inwardly extending portion and the outwardly extending portion are arranged on different sides of the intermediate connecting portion in the thickness direction of the electronic device, the inwardly extending portion is T-shaped, and the outwardly extending portion has a first step surface and a second step surface, the edge of the housing supports the first step surface while the second step surface supports the edge of the screen, and the first step surface and the second step surface are parallel to each other.

2. The electronic device according to claim 1, wherein:

a main part is arranged within the accommodation cavity; and the circuit board is fixed to a first side of the main part, the screen is located on a second side of the main part, and the screen holder surrounds the main part.

3. The electronic device according to claim 1, wherein:

the inwardly extending portion is electrically coupled to the circuit board, two ends of the intermediate connecting portion are coupled to the inwardly extending portion and the outwardly extending portion correspondingly, and the outwardly extending portion passes through the gap and supports the edge of the screen.

4. The electronic device according to claim 1, wherein the screen holder comprises a plurality of antenna radiators, each of the antenna radiators is electrically coupled to the circuit board, and two or more of the antenna radiators have different signal frequency bands.

5. The electronic device according to claim 4, wherein the plurality of antenna radiators are spaced apart by insulators.

6. The electronic device according to claim 5, wherein each of the insulators has a width less than or equal to 2 mm.

7. The electronic device according to claim 4, wherein a signal band of the two or more of the antenna radiators is a 2G frequency band; a signal band of the two or more of the antenna radiators is a 3G frequency band; a signal band of the two or more of the antenna radiators is a 4G frequency band; and a signal band of the two or more of the antenna radiators is a 5G frequency band.

8. The electronic device according to claim 1, wherein a UWB antenna is arranged on an inner wall of the housing, and the UWB antenna is electrically coupled to the circuit board.

9. The electronic device according to claim 1, wherein each antenna radiator is electrically coupled to the circuit board by a feeder elastic sheet.

10. The electronic device according to claim 1, wherein a plastic layer is attached to an inner surface of the housing.

11. The electronic device according to claim 10, wherein an edge of the plastic layer is formed with a support platform, and the support platform supports the screen holder.

12. The electronic device according to claim 11, wherein a waterproof adhesive layer is arranged between the support platform and the screen holder.

13. The electronic device according to claim 1, wherein a plurality of antenna radiators are arranged around the screen using a laser-direct-structuring process.

14. The electronic device according to claim 1, wherein the screen holder is made of plastic and metal materials.

15. The electronic device according to claim 1, wherein a main part acts as the ground, and is electrically coupled to the circuit board and the at least one antenna radiator.

16. An electronic device, comprising:

an integrally molded ceramic housing having an accommodation cavity, a circuit board being positioned in the accommodation cavity;

a screen; and a screen holder coupled to the housing and shaped as a hollow frame having an open structure to hold the screen, an edge of the screen being positioned on the screen holder, wherein the screen holder comprises at least one antenna radiator electrically coupled to the circuit board to receive and/or transmit signals; and wherein a cross section of the screen holder comprises an inwardly extending portion, an intermediate connecting portion, and an outwardly extending portion, the inwardly extending portion being an innermost portion of the screen holder; and the inwardly extending portion and the outwardly extending portion both extend along a thickness direction of the electronic device;

wherein a gap exists between an edge of the housing and the edge of the screen and has a size of no more than 1.2 mm;

the inwardly extending portion and the intermediate connecting portion are in the accommodation cavity, and an end of the outwardly extending portion away from the intermediate connecting portion passes through the gap, the inwardly extending portion and the outwardly extending portion extend from the intermediate connecting portion in directions facing away from each other, respectively, wherein the screen holder comprises a plurality of antenna radiators, each of the antenna radiators is electrically coupled to the circuit board, and two or more of the antenna radiators have different signal frequency bands, wherein the plurality of antenna radiators are spaced apart by insulators, wherein each of the insulators has a width less than or equal to 2 mm, wherein a signal band of the two or more of the antenna radiators is a 2G frequency band; a signal band of the two or more of the antenna radiators is a 3G frequency band; a signal band of the two or more of the antenna radiators is a 4G frequency band; and a signal band of the two or more of the antenna radiators is a 5G frequency band, wherein each antenna radiator is electrically coupled to the circuit board by a feeder elastic sheet, the inwardly extending portion is T-shaped, and the outwardly extending portion has a first step surface and a second step surface, the edge of the housing supports the first step surface while the second step surface supports the edge of the screen, and the first step surface and the second step surface are parallel to each other.

* * * * *